United States Patent
Celikkan et al.

(10) Patent No.: US 7,428,306 B2
(45) Date of Patent: Sep. 23, 2008

(54) ENCRYPTION APPARATUS AND METHOD FOR PROVIDING AN ENCRYPTED FILE SYSTEM

(75) Inventors: Ufuk Celikkan, Austin, TX (US); William C. Conklin, Georgetown, TX (US); Shawn P. Mullen, Buda, TX (US); Ravi A. Shankar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 11/406,184

(22) Filed: Apr. 18, 2006

(65) Prior Publication Data
US 2007/0253549 A1 Nov. 1, 2007

(51) Int. Cl.
*H04L 9/14* (2006.01)

(52) U.S. Cl. ............................. 380/28; 380/29; 380/42; 380/43

(58) Field of Classification Search ................... 380/42, 380/28, 37, 277
See application file for complete search history.

(56) References Cited

U.S. PATENT DOCUMENTS

| | | | |
|---|---|---|---|
| 4,074,066 A | 2/1978 | Ehrsam et al. | |
| 6,249,866 B1 | 6/2001 | Brundrett et al. | |
| 6,324,286 B1 | 11/2001 | Lai et al. | |
| 6,405,315 B1 | 6/2002 | Burns et al. | |
| 6,772,343 B1* | 8/2004 | Shimizu et al. | 713/193 |
| 6,952,477 B1 | 10/2005 | Lotspiech | |
| 6,986,043 B2 | 1/2006 | Andrew et al. | |
| 7,092,525 B2* | 8/2006 | Matchett et al. | 380/29 |
| 7,093,126 B1* | 8/2006 | Jutla | 713/168 |
| 7,103,180 B1* | 9/2006 | McGregor, Jr. | 380/28 |
| 7,151,831 B2* | 12/2006 | Candelore et al. | 380/200 |
| 7,155,657 B2* | 12/2006 | Bordes et al. | 714/774 |

(Continued)

FOREIGN PATENT DOCUMENTS

EP 0982894 A1 3/2000

(Continued)

OTHER PUBLICATIONS

Campbell et al., "Trusted Objects", 1999, pp. 1-7, obtained from http://www.osti.gov/bridge/servlets/purl/14158-EYOITP/webviewable/14158.pdf.*

*Primary Examiner*—Emmanuel I Moise
*Assistant Examiner*—Jeffrey D Popham
(74) *Attorney, Agent, or Firm*—Stephen J. Walder, Jr.; Matthew W. Baca (57) ABSTRACT

An encryption apparatus and method for providing an encrypted file system are provided. The encryption apparatus and method of the illustrative embodiments uses a combination of encryption methodologies so as to reduce the amount of decryption and re-encryption that is necessary to a file in the Encrypted File System in the event that the file needs to be modified. The encryption methodologies are interleaved, or alternated, with regard to each block of plaintext. In one illustrative embodiment, Plaintext Block Chaining (PBC) and Cipher Block Chaining (CBC) encryption methodologies are alternated for encrypting a sequence of blocks of data. The encryption of a block of plaintext is dependent upon the plaintext or a cipher generated for the plaintext of a previous block of data in the sequence of blocks of data so that the encryption is more secure than known Electronic Code Book encryption methodologies.

7 Claims, 6 Drawing Sheets

U.S. PATENT DOCUMENTS

| | | | |
|---|---|---|---|
| 7,200,226 B2* | 4/2007 | Bace | 380/37 |
| 7,203,842 B2* | 4/2007 | Kean | 713/189 |
| 7,280,956 B2* | 10/2007 | Cross et al. | 713/171 |
| 2001/0018736 A1* | 8/2001 | Hashimoto et al. | 713/1 |
| 2001/0040883 A1* | 11/2001 | Chang et al. | 370/344 |
| 2002/0051534 A1* | 5/2002 | Matchett et al. | 380/37 |
| 2002/0101989 A1* | 8/2002 | Markandey et al. | 380/210 |
| 2003/0063741 A1 | 4/2003 | Hanounki | |
| 2003/0188179 A1 | 10/2003 | Challener et al. | |
| 2003/0228018 A1* | 12/2003 | Vince | 380/277 |
| 2004/0015768 A1* | 1/2004 | Bordes et al. | 714/758 |
| 2004/0059912 A1 | 3/2004 | Zizzi | |
| 2004/0223611 A1* | 11/2004 | Yan et al. | 380/37 |
| 2004/0230805 A1* | 11/2004 | Peinado et al. | 713/181 |
| 2004/0250091 A1 | 12/2004 | Henry et al. | |
| 2005/0132201 A1* | 6/2005 | Pitman et al. | 713/176 |
| 2005/0144468 A1* | 6/2005 | Northcutt et al. | 713/189 |
| 2005/0166069 A1* | 7/2005 | Hashimoto et al. | 713/194 |
| 2005/0180572 A1* | 8/2005 | Graunke | 380/277 |
| 2005/0234655 A1* | 10/2005 | Batra et al. | 702/20 |
| 2006/0037041 A1* | 2/2006 | Zhang | 725/32 |
| 2006/0075225 A1* | 4/2006 | Flynn et al. | 713/165 |
| 2006/0107044 A1* | 5/2006 | Krishna et al. | 713/166 |
| 2006/0153379 A1* | 7/2006 | Candelore et al. | 380/216 |
| 2006/0159266 A1* | 7/2006 | Chavanne et al. | 380/262 |
| 2006/0245588 A1* | 11/2006 | Hatakeyama | 380/37 |
| 2006/0294595 A1* | 12/2006 | Drihem | 726/27 |

FOREIGN PATENT DOCUMENTS

GB    2374260 A    10/2002

* cited by examiner

ENCRYPTION APPARATUS AND METHOD FOR PROVIDING AN ENCRYPTED FILE SYSTEM

BACKGROUND

1. Technical Field

The present application relates generally to an improved data processing system and method. More specifically, the present application is directed to an encryption apparatus and method for providing an encrypted file system.

2. Description of Related Art

The Encrypting File System (EFS) is a file system available in Microsoft's Windows 2000™, Windows XP™, Windows Server 2003™, and now Windows Media Center 2005™ operating systems. The EFS technology transparently allows files to be stored encrypted on NT File System (NTFS) or other type file systems to protect confidential data from attackers with physical access to the computer.

User authentication and access control lists can protect files from unauthorized access while the operating system is running, but are easily circumvented if an attacker gains physical access to the computer. A solution is to store the files encrypted on the disks of the computer. EFS does this using public key cryptography and aims to ensure that decrypting the files is practically impossible without the correct key. However, EFS does not prevent brute-force attacks against the user account passwords. In other words, file encryption doesn't provide much protection if the account password is easily guessed.

With EFS, files and folders that are to be encrypted by the file system must be marked with an encryption attribute. As with file permissions in NTFS, for example, if a folder is marked for encryption then by default all files and subfolders that exist in the folder are also encrypted. When files are copied to another volume that is formatted with another file system (for instance FAT32) then the files and/or folders are decrypted before copying them over to that file system. The only exception is when files are backed up, in which case the files are not decrypted.

EFS works by encrypting a file with a bulk symmetric key (also known as the File Encryption Key, or FEK), which is used because it takes a relatively smaller amount of time to encrypt and decrypt large amounts of data than if an asymmetric key cipher is used. The symmetric key that is used to encrypt the file is then encrypted with a public key that is associated with the user who encrypted the file, and this encrypted data is stored in the header of the encrypted file. To decrypt the file, the file system uses the private key of the user to decrypt the symmetric key that is stored in the file header. It then uses the symmetric key to decrypt the file. Because this is done at the file system level, it is transparent to the user. More information regarding Microsoft's EFS may be obtained from Wikipedia at www.wikipedia.org and Microsoft at www.microsoft.com.

Figure 1:
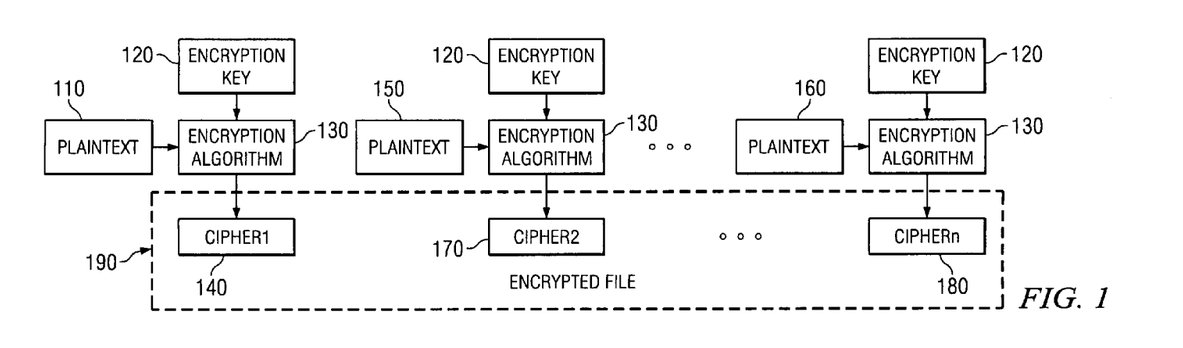
FIG. 1 is an exemplary diagram illustrating an Electronic Code Book encryption methodology for encrypting plaintext in accordance with a known mechanism.

The encryption used by EFS is referred to as Electronic Code Book (ECB) encryption. With ECB encryption, a block of data that is the length of the encryption key, e.g., 56 bits, 128 bits, or the like, is encrypted with the encryption key using an encryption algorithm such as Data Encryption Standard (DES), Triple Data Encryption Standard (3DES), Advanced Encryption Standard (AES), or the like. ECB encryption is shown conceptually in FIG. 1. As shown in FIG. 1, a block of plaintext 110 is input along with the encryption key 120 to an encryption algorithm 130. The encryption algorithm 130 encrypts the plaintext 110 using the encryption key 120 to generate a first cipher text 140. This type of encryption is performed for each block of plaintext 110, 150 and 160 to generate cipher texts 140, 170 and 180 that are part of a sequence of encrypted data blocks that comprise the encrypted file 190.

Using the ECB encryption methodology, a cryptanalyst can break the encryption without ever discovering the encryption key 120. The weakness in this method is due to cribs, i.e. known plaintext, and stereotypical beginnings and endings. For example, if the cryptanalyst knows that a mail message begins with "To:Bob" and the cipher is "oxG29vq", then on all other messages, when the cryptanalyst encounters "oxG29vq", he cryptanalyst will know that the plaintext is "To:Bob". Because of this vulnerability, most security systems, such as IPsec, ssh, etc., do not use ECB.

ECB encryption is used with known Encrypted File Systems because of the speed at which the encryption mechanism may be applied to plaintext. That is, if a change is necessary to a portion of a file in an Encrypted File System, the portion of the file that needs to be modified may be quickly decrypted, modified, and re-encrypted, since each block of plaintext is encrypted independent of each other block of plaintext. However, as mentioned above, ECB encryption has inherent weaknesses with regard to the ability to generate mappings between cipher text and plaintext. More elaborate, and more secure encryption methodologies, are not used in known Encrypted File Systems because they require that the entire file, or a significant portion of the file, be decrypted, modified, and then re-encrypted every time the slightest change is made to a file. Such encryption mechanisms create significant performance penalties that are not suitable for use with an Encrypted File System.

SUMMARY

The illustrative embodiments provide an encryption apparatus and method for providing an encrypted file system. The encryption apparatus and method of the illustrative embodiments uses a combination of encryption methodologies so as to reduce the amount of decryption and re-encryption that is necessary to a file in the Encrypted File System in the event that the file needs to be modified. The encryption methodologies are interleaved, or alternated, with regard to each block of plaintext. The encryption of a block of plaintext is dependent upon the encryption of a previous block of plaintext so that the encryption is more secure than ECB encryption methodologies as previously discussed above. The encryption methodology of the illustrative embodiments is referred to as an Alternating Block Chaining (ABC) encryption methodology.

The ABC encryption methodology reduces the number of file blocks that must be decrypted, modified, and/or re-encrypted when compared to known Plaintext Block Chaining (PBC) and Cipher Block Chaining (CBC) methodologies alone. The ABC encryption methodology reduces the number of file blocks that must be decrypted, modified, and/or re-encrypted to the changed block plus two additional blocks, i.e. three blocks of plaintext data.

In one illustrative embodiment, this improvement over known methodologies is obtained by combining PBC and CBC encryption methodologies in alternating blocks of plaintext data. For example, all odd numbered blocks of plaintext data may be encrypted using CBC encryption and all even numbered blocks of plaintext data may be encrypted using PBC encryption. Therefore, the re-encryption cycle stops after two blocks of plaintext data. Moreover, when reading a block of plaintext data into memory, only the desired block of plaintext data and at most the two preceding blocks of plaintext data need to be decrypted.

Moreover, ABC encryption, in accordance with the illustrative embodiments, requires only one initialization vector for an entire portion of data being encrypted, e.g., a file. Since the encryption mechanisms are alternated, an initialization vector is only used with the first block of data encrypted using the first encryption mechanism. Subsequent blocks of data are encrypted using either the plaintext or cipher for the previous block of data. In addition, block chaining may be used throughout the portion of data, e.g., file, without having to re-write the entire portion of data after every data change.

In one illustrative embodiment, a method is provided for encrypting a sequence of data. The method may comprise receiving the sequence of data, processing blocks of data in the sequence of data using at least two encryption mechanisms to generate an encrypted sequence of data, and outputting the encrypted sequence of data. The processing of the blocks of data in the sequence of data using the at least two encryption mechanisms may comprise alternating between the at least two encryption mechanisms at each block of data in the sequence of data. In one illustrative embodiment, outputting the encrypted sequence of data may comprise storing the encrypted sequence of data as a file in an Encrypted File System (EFS).

The alternating between the at least two encryption mechanisms at each block of data in the sequence of data may comprise encrypting a first block of data, in the sequence of data, using a first encryption mechanism and encrypting a second block of data, in the sequence of data, using a second encryption mechanism that is different from the first encryption mechanism. The encryption of the second block of data by the second encryption algorithm may be dependent upon one of an input or an output of the first encryption mechanism. The alternating between the at least two encryption mechanisms may further comprise encrypting a third block of data, in the sequence of data, using the first encryption mechanism. The encryption of the third block of data by the first encryption mechanism may be dependent upon one of an input or an output of the second encryption mechanism.

In one illustrative embodiment at least one of the first encryption mechanism and the second encryption mechanism may implement a Plaintext Block Chaining (PBC) encryption methodology. Furthermore, in an illustrative embodiment at least one of the first encryption mechanism and the second encryption mechanism may implement a Cipher Block Chaining (CBC) encryption methodology.

Moreover, in one illustrative embodiment the first encryption mechanism implements a Cipher Block Chaining (CBC) encryption methodology and the second encryption mechanism implements a Plaintext Block Chaining (PBC) encryption methodology. The first encryption mechanism may utilize a cipher generated for a previous block of data in the sequence of data to generate a first key for the CBC encryption methodology. The second encryption mechanism may utilize plaintext data for a previous block of data in the sequence of data to generate a second key for the PBC encryption methodology.

In one illustrative embodiment, all odd numbered blocks of data in the sequence of data may be encrypted using the first encryption mechanism that implements the CBC encryption methodology. All even numbered blocks in the sequence of data may be encrypted using the second encryption mechanism that implements the PBC encryption methodology.

In an illustrative embodiment, the first encryption mechanism may utilize the cipher generated for the previous block of data to generate the first key by logically combining the cipher with a first encryption key. The second encryption mechanism may utilize the plaintext data for the previous block of data to generate the second key by logically combining the plaintext data with a second encryption key. The second encryption key may be one of the same as or different from the first encryption key.

The method may, in another illustrative embodiment, comprise receiving the encrypted sequence of data, identifying a block of data, in the sequence of data, to be modified, determining an encryption methodology used to encrypt the block of data to be modified. The method may further comprise decrypting the block of data based on the determined encryption methodology used to encrypt the block of data, modifying the block of data to be modified, and re-encrypting the block of data to be modified following modification.

The decrypting of the block of data based on the determined encryption methodology may comprise decrypting a previous block of data in the sequence of data, that is just prior to the block of data to be modified in the sequence of data, using a cipher for a block of data that is just prior to the previous block of data to obtain plaintext data for the previous block of data. Moreover, decrypting the block of data may comprise decrypting the block of data to be modified based on the obtained plaintext data for the previous block of data.

Re-encrypting the block of data to be modified following modification may comprise re-encrypting up to two additional blocks of data following the block of data to be modified in addition to the block of data to be modified. Moreover, decrypting the block of data based on the determined encryption methodology may comprise decrypting up to one block of data prior to the block of data to be modified, in the sequence of data, in addition to the block of data to be modified.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided for encrypting a sequence of data. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The illustrative embodiments are directed to mechanisms for encrypting portions of data, such as a file. More specifically, the mechanisms of the illustrative embodiments provide an encryption methodology that may be utilized in providing an encrypted file system where modifications to blocks of plaintext data may be quickly and efficiently made while maintaining a high level of security.

The mechanisms of the illustrative embodiments may be utilized with any data processing device to perform encryption of a portion of data. In the illustrative embodiments, the mechanisms are used to provide an encrypted file system. However, the present invention is not limited to use with encrypted file systems and may be utilized to perform encryption of data for any desired reason.

Figure 2:
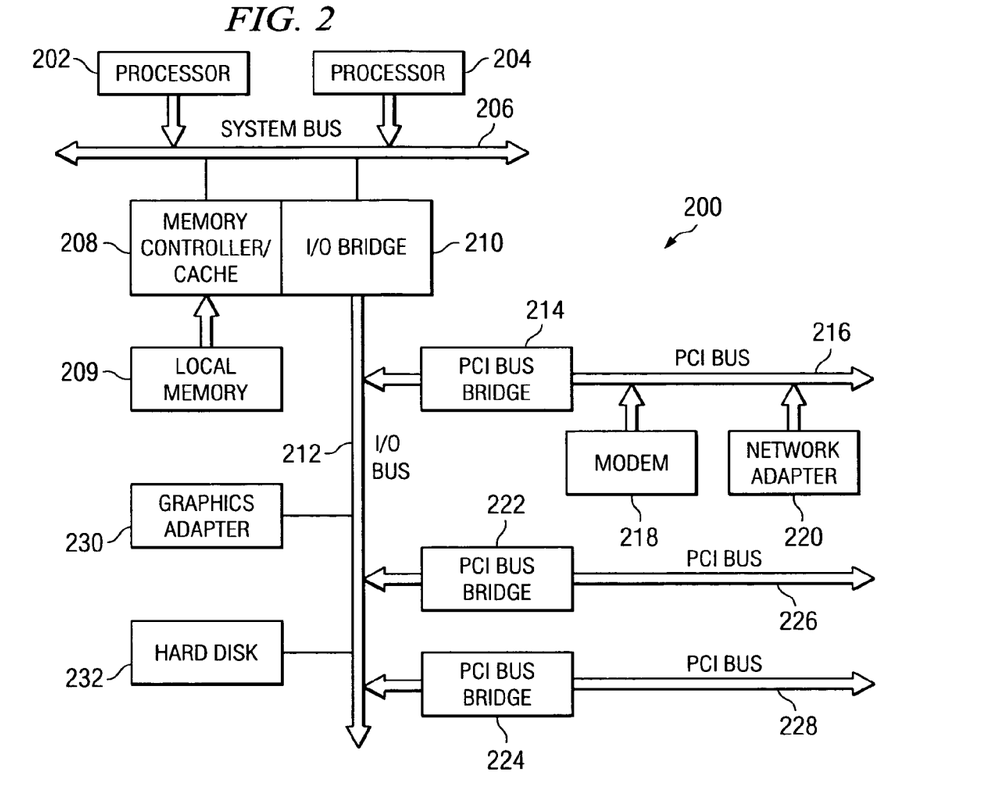
FIG. 2 is an exemplary block diagram of a data processing system in which the illustrative embodiments may be implemented.

FIG. 2 is an exemplary block diagram of a data processing system in which the illustrative embodiments may be implemented. FIG. 2 is only intended to be exemplary and is not intended to state or imply any limitation with regard to the types of data processing systems in which the illustrative embodiments may be implemented. For example, while FIG. 2 illustrates a single data processing system, the mechanisms of the illustrative embodiments may be utilized in a distributed data processing environment in which a plurality of data processing systems communicate with one another and are able to transfer data between each other. One or more of such data processing systems may make use of the encryption methodologies of the illustrative embodiments and the encrypted file system utilizing the encryption methodology of the illustrative embodiments.

Referring to FIG. 2, a block diagram of a data processing system that may be implemented as a server, stand-alone computing device, client computing device, or the like, is depicted in accordance with one illustrative embodiment. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to other data processing systems may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system 200 depicted in FIG. 2 may be, for example, an IBM eServer pSeries system, a product of International Business Machines Corporation in Armonk, N.Y., running the Advanced Interactive Executive (AIX) operating system or LINUX operating system. Alternatively, the data processing system 200 may be a stand-alone system configured to be bootable without relying on some type of network communication interfaces, a network attached client data processing device, a personal digital assistant (PDA) device which is configured with ROM and/or flash ROM in order to provide non-volatile memory for storing operating system files and/or user-generated data, a wireless communication device, a notebook computing device, a hand-held computing device, a computerized kiosk, a Web appliance, or any other type of data processing system in which encryption of data is of importance.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Thus, the depicted example in FIG. 2 is not meant to imply architectural limitations.

In a preferred embodiment, the data processing system 200 implements an encrypted file system (EFS), such as in hard disk 232. Hardware, software, or a combination of hardware and software mechanisms may be provided in the data processing system 200 to provide an encryption methodology in accordance with the illustrative embodiments described herein, so as to enable the maintaining of such an EFS.

Rather than using ECB encryption, as is generally done in known EFS based systems, the illustrative embodiments use a combination of a plurality of encryption methodologies to provide an Alternating Block Chaining (ABC) encryption methodology. Due to its inherent weakness as described above, most security systems use either Plaintext Block Chaining (PBC) or Cypher Block Chaining (CBC). With PBC encryption the plaintext block is XOR'd with the encryption key to generate a new encryption key for each cipher. With CBC encryption, the cipher generated for a previous block of plaintext is XOR'd with the encryption key to generate a new encryption key for generating a new cipher.

Figure 3:
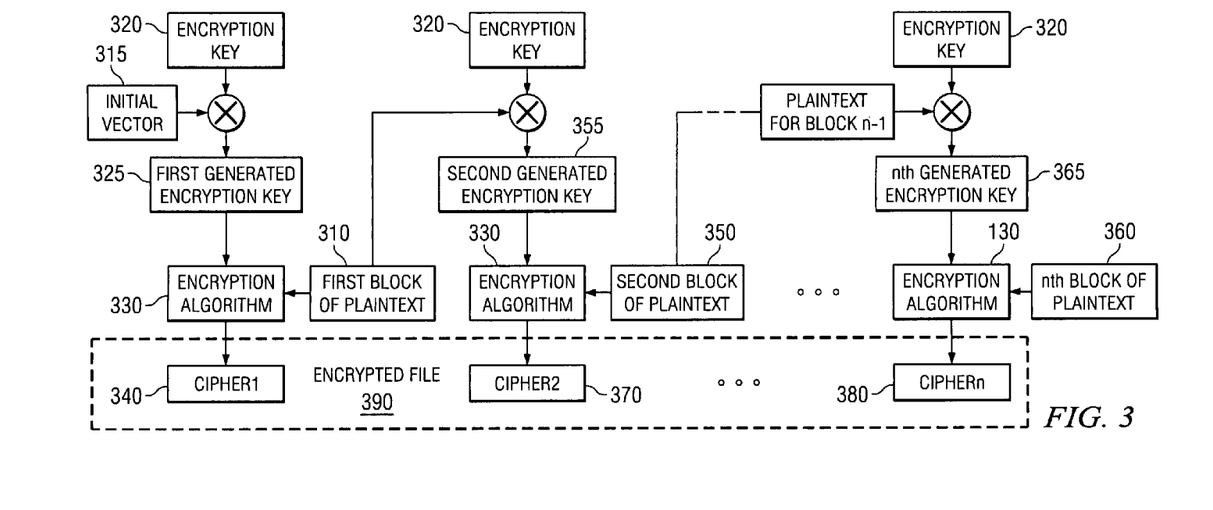
FIG. 3 is an exemplary diagram illustrating a Plaintext Block Chaining encryption methodology for encrypting plaintext in accordance with a known mechanism.

PBC encryption is illustrated in FIG. 3. As shown in FIG. 3, for a first block of plaintext 310, an initial vector (IV) 315 is XOR'd with the encryption key 320 to generate a first generated encryption key 325 for encrypting the first block of plaintext 310. The first generated encryption key 325 is provided along with the first block of plaintext 310 to the encryption algorithm 330 which operates on the plaintext 310 based on the first generated encryption key 325 and generates a first cipher text 340. The first block of plaintext 310 is then used to encrypt a subsequent block of plaintext 350.

The first block of plaintext 310 is XOR'd with the encryption key 320 to generate a second generated encryption key 355. The second generated encryption key 355 is provided, along with the second block of plaintext 350, to the encryption algorithm 330. The encryption algorithm 330 which operates on the second block of plaintext 350 based on the second generated encryption key 355 to generate a second cipher text 360. This process is repeated with each subsequent block of plaintext being encrypted using an encryption key generated based on a previous block of plaintext. The resulting encrypted file 390 comprises the cipher text 340, 370 and 380, for example. With PBC encryption, it is not possible to develop a mapping of encrypted text to plaintext, such as in the Electronic Code Book encryption, because the same plaintext appearing in a different portion of code will not be encrypted in the same manner due to the XOR'ing of the previous block of plaintext with the encryption key to generate a new encryption key for actually encrypting the block of plaintext.

Cipher Block Chaining (CBC) encryption is similar to PBC encryption except that the cipher generated for a previous block of plaintext is used to generate a new encryption key for encrypting a subsequent block of plaintext. CBC encryption is illustrated in FIG. 4.

Figure 4:
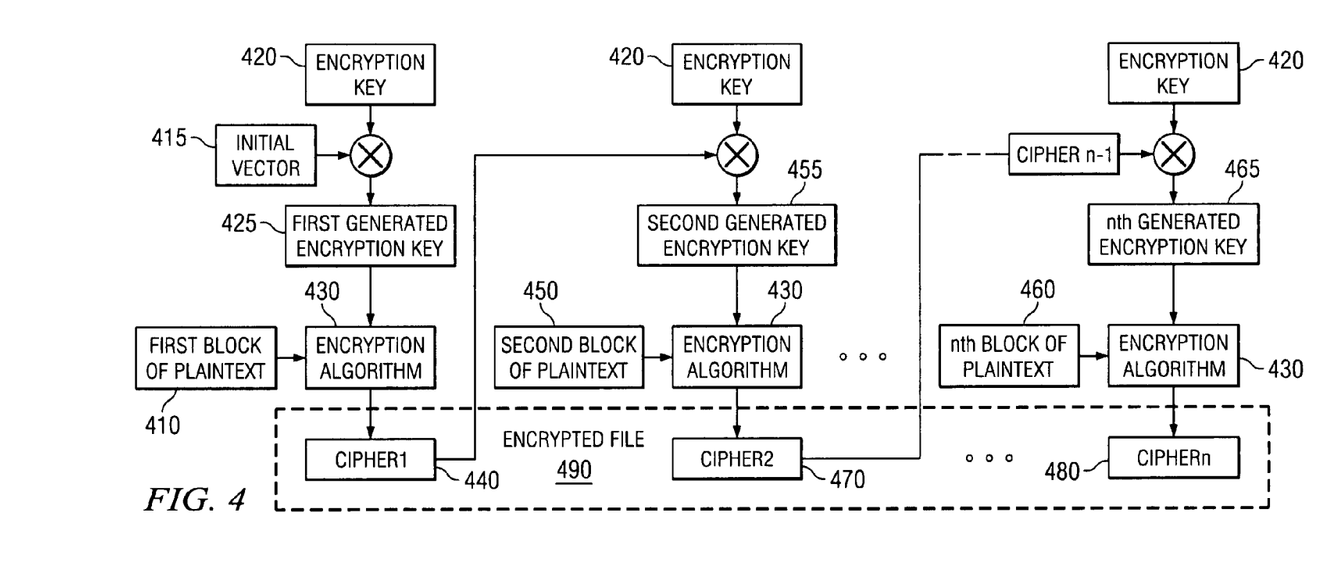
FIG. 4 is an exemplary diagram illustrating a Cipher Block Chaining encryption methodology for encrypting plaintext in accordance with a known mechanism.

As shown in FIG. 4, an initial vector 415 is XOR'd with an encryption key 420 to generate a first encryption key 425 which is provided to the encryption algorithm 430 along with the first block of plaintext 410. The first generated encryption key 425 is used to control the operation of the encryption algorithm 430 on the first plaintext block 410 to generate a first cipher text 440. The first cipher text 440 is used along with the encryption key 425 to generate a second encryption key 455 which is provided to the encryption algorithm 430 to encrypt the second block of plaintext data 450. This operation is repeated for each subsequent block of plaintext data that is to be encrypted to thereby generate encrypted file 490. Thus, similar to the PBC encryption mechanism described above, CBC encryption makes encryption of subsequent blocks of plaintext data dependent upon the encryption of a previous block of plaintext data.

When attempting to apply PBC encryption or CBC encryption to an Encrypted File System (EFS), the dependency of the encryption of each block of plaintext data on a previous block of plaintext data or the cipher generated by the encryption of the previous block of plaintext data makes the modification of encrypted data time consuming from a processor cycle perspective. When the file system reads and decrypts a portion of data, e.g., a file, to bring it into memory, a great deal of latency is experienced.

If a single bit is to be changed in a file, for example, then this changes the plaintext or cipher that is XOR'd with the encryption key to generate an encryption key that is used to encrypt the next block of plaintext data, and so on. Thus, the entire file, or at least a significant portion of the file, needs to be re-encrypted for this single bit change. For example, with PBC encryption, before a single bit in the file may be changed, the encrypted data blocks preceding the block of plaintext data that is to be modified must all be decrypted in order to reveal their plaintext data. This is because the encryption of the block of plaintext data that is to be modified is encrypted based on the plaintext of the block preceding it, which is encrypted based on the plaintext of the block preceding that one, and so on. Thus, the only way to decrypt the block of data that is to be modified is to decrypt all blocks preceding the block that is to be modified.

With CBC encryption, while the cipher of the previous block of data may be readily identifiable and thus, the block that is to be modified may be decrypted and modified, the modification of this block results in a different cipher being created for the modified block. As a result, all blocks of data after the block that is modified must be decrypted and then re-encrypted using the new cipher for the modified block. Thus, in both PBC and CBC, either the entire file, or a significant portion of the file, must be decrypted and re-encrypted in order to make the slightest change in a file.

This requirement to decrypt and re-encrypt the entire file, or significant portion of the file, becomes performance prohibitive in an EFS in which modifications to files are performed frequently. As a result, known EFS systems, such as the EFS provided by Microsoft, to use Electronic Code Book (ECB) encryption in their EFS. As discussed above, ECB encryption is not a strong encryption methodology and can be easily broken by cryptoanalysts based on the identification of cribs. Thus, it would be beneficial to have an apparatus and method for using a more secure encryption methodology with an EFS. The illustrative embodiments herein provide such an apparatus and method.

Figure 5:
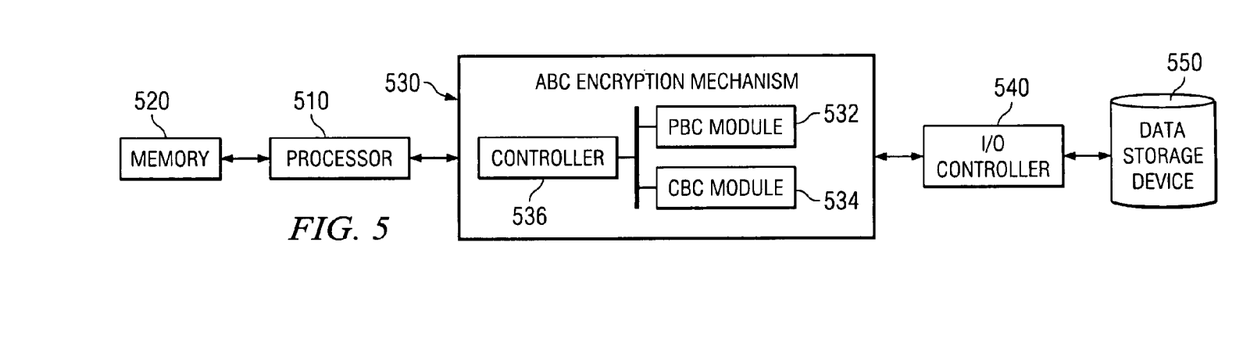
FIG. 5 is an exemplary block diagram illustrating the primary operational components for providing an encrypted file system (EFS) in accordance with one illustrative embodiment.

FIG. 5 is an exemplary block diagram illustrating the primary operational components for providing an encrypted file system (EFS) in accordance with one illustrative embodiment. As shown in FIG. 5, the primary operational components include a processor 510, a memory 520 coupled to the processor 510, an Alternating Block Chaining (ABC) encryption mechanism 530, an input/output (I/O) controller 540, and a data storage device 550. The data storage device 550 is accessible to the processor 510 via the ABC encryption mechanism 530 and the I/O controller 540. In one illustrative embodiment, the ABC encryption mechanism 530 may be integrated with the I/O controller 540, for example. In such an embodiment, the ABC encryption mechanism 530 may be provided as a separate hardware device that is integrated into an I/O interface chip, card or the like.

In one illustrative embodiment, the processor 510 may be processor 202 or 204 in FIG. 2, for example. The memory 520 may be local memory 209, the I/O controller 540 may be memory/cache controller 208, and the data storage may be hard disk 232 in FIG. 2, for example. The ABC encryption mechanism 530 may be implemented as a separate hardware device in the data processing system 200 in FIG. 2, as software instructions executed by the processor 202 or 204 in FIG. 2, a combination of hardware and software, or the like, for example.

In the depicted example implementation, the ABC encryption mechanism 530 includes PBC encryption/decryption module 532, a CBC encryption/decryption module 534, and a controller 536 for controlling and orchestrating the operation of the PBC encryption/decryption module 532 and the CBC encryption/decryption module 534. While the depicted example utilizes PBC and CBC encryption/decryption, the illustrative embodiments are not limited to such. Rather, any encryption methodologies that are capable of being interleaved or alternated on a data block-by-block basis may be utilized without departing from the spirit and scope of the present invention. Moreover, while the depicted example implementation uses only two different encryption methodologies, the illustrative embodiments are not limited to such. Rather any number of encryption methodologies may be interleaved, or alternated, in accordance with the mechanisms described hereafter without departing from the spirit and scope of the present invention.

The ABC encryption mechanism 530 further includes an encryption key storage 550. The encryption key storage 550 stores the encryption key which is utilized in the PBC and CBC encryption/decryption modules 532 and 534 to encrypt/decrypt the plaintext data that is input to the ABC encryption mechanism 530. Depending upon the particular encryption/decryption being performed, in one illustrative embodiment, the encryption key is either XOR'd with a block of plaintext data (or an initial vector in the case of a first block of plaintext data) or a cipher generated based on a block of plaintext data for a previous block of plaintext data that is encrypted prior to a current block of plaintext data. It should be appreciated that while an XOR operation is performed in the illustrative embodiments, the present invention is not limited to such an operation and other logical operations for combining the encryption key and either the plaintext or cipher from a previous block of data may be used without departing from the spirit and scope of the present invention.

As shown in FIG. 5, a file or portion of data, may be encrypted and written from a memory 520 to an EFS 560 of data storage device 540 and/or read from the EFS 560 of data storage device 540, decrypted and loaded into memory 520 via the ABC encryption mechanism 530. The ABC encryption mechanism 530 utilizes the PBC and CBC encryption/decryption modules 532 and 534 to alternate encryption of blocks of data input to the ABC encryption mechanism 530. For example, the ABC encryption mechanism 530 uses the PBC encryption/decryption module 532 to encrypt/decrypt even numbered blocks of data and uses the CBC encryption/decryption module 534 to encrypt/decrypt odd numbered blocks of data that are input to the ABC encryption mechanism 530. Of course, the present invention is not limited to such an arrangement, as discussed previously above.

Figure 6:
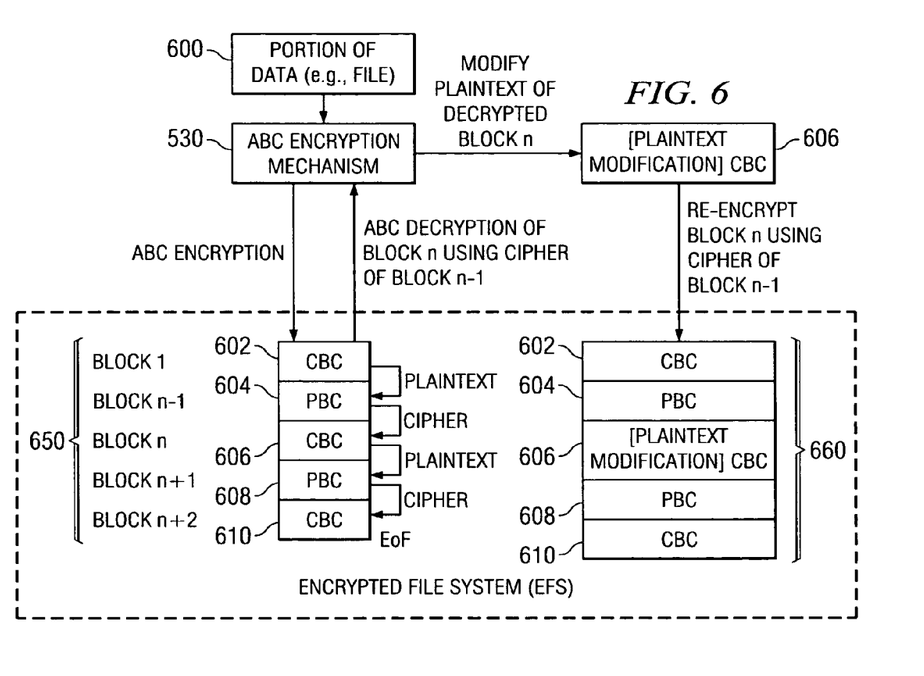
FIG. 6 is an exemplary diagram illustrating the encryption/decryption of a portion of data using the ABC encryption mechanism in accordance with one illustrative embodiment.

FIG. 6 is an exemplary diagram illustrating the encryption/decryption of a portion of data, such as a file, using the ABC encryption mechanism in accordance with one illustrative embodiment. As shown in FIG. 6, a portion of data 600 includes a plurality of blocks of data 602-610. The blocks of data 602-610 may be 4 Kilobyte blocks of data, for example. Other block sizes may be used without departing from the spirit and scope of the present invention.

When the portion of data 600 is input to the ABC encryption mechanism 530, the portion of data 600 is partitioned into the blocks of data 602-610 and alternating blocks of data are encrypted using the PBC and CBC encryption/decryption modules 532 and 534 to generate encrypted portion of data 650. For example, a first block of data 602 is encrypted using the CBC encryption/decryption module 534, a second block of data 604 is encrypted using the PBC encryption/decryption module 532, the third block of data 606 is encrypted using the CBC encryption/decryption module 534, and the fourth block of data 608 is encrypted using the PBC encryption/decryption module 532. This alternating application of the PBC and CBC encryption/decryption modules 532 and 534 to the blocks of data may continue for all blocks of data in the portion of data 600.

For the first block of data 602, an initial vector is provided along with the encryption key and the block of data 602 to the ABC encryption mechanism. The initial vector and encryption key are XOR'd to generate a first encryption key which is used by a CBC encryption algorithm to encrypt the plaintext data for the first block of data 602. The plaintext data for this first block of data 602 is provided to the PBC encryption algorithm along with the encryption key and a second block of plaintext data to be encrypted. The plaintext data for the first block of data 602 is XOR'd with the encryption key to generate a second encryption key that is used by the PBC encryption algorithm to encrypt the second block of data 604.

The resulting cipher text is provided as input to the CBC encryption algorithm along with the encryption key and a third block of plaintext data to be encrypted. The cipher text from the second block of data 604 is XOR'd with the encryption key to generate a third encryption key which is used by the CBC encryption algorithm to encrypt the third block of plaintext data 606. The third block of plaintext data is provided to the PBC encryption algorithm along with the encryption key and a fourth block of plaintext data to be encrypted and the process continues in a similar manner as described above. Thus, each encryption of a subsequent block of plaintext data is dependent upon either the plaintext data of a previous block of data that is encrypted or the cipher text generated by the encryption of a previous block of plaintext data. As a result, a more secure encryption methodology is provided than that provided by ECB encryption.

It should be noted that while the illustrative embodiments are described with each encryption being based on the same encryption key as modified by either the plaintext or cipher for a previous block of data, the present invention is not limited to such. Rather, different encryption keys may be used with one or more blocks of data being encrypted. If different encryption keys are utilized, a mechanism for keeping track of which encryption keys were utilized with each block of data is provided in the ABC encryption mechanism 530. For example, it may be determined that the encryption key is changed for every X number of blocks of data and a particular order of encryption keys may be maintained in a secure storage accessible by the ABC encryption mechanism 530. Any manner by which it can be determined which encryption key was used to generate an encryption key for encrypting a portion of an ABC encrypted portion of data may be utilized with the illustrative embodiments without departing from the spirit and scope of the present invention.

To read and decrypt a block of data, such as block n in the depicted example, the preceding block does not need to be decrypted because block n is encrypted with CBC encryption. Thus, all that needs to be known is the last few bytes of the cipher text of the previously encrypted block n−1. These last few bytes of the cipher text are used to XOR with the key and start decrypting block n. After block n is modified, only block n needs to be re-encrypted to generate the encrypted modified portion of data 660. Block n+1 does not need to be re-encrypted because it is encrypted with PBC encryption and, in the depicted example, the last few bytes of plaintext of block n were not modified. Thus, only the modified block needs to be re-encrypted.

However, if the last few blocks of block n were modified, then the n+1 and n+2 blocks of data would need to be re-encrypted. That is, the plaintext for block n would be changed and thus, the encryption key used for the PBC encryption of block n+1 would be modified. As a result the cipher text generated by the PBC encryption of block n+1 would also be modified. This modified cipher text would then be used to generate a new encryption key for block n+2 and thus, the cipher text generated for block n+2 would be modified from the original cipher text. However, since the next block of data would be encrypted using PBC encryption, and the plaintext for block n+2 was not modified, the encryption of subsequent blocks of data, i.e. n+3 to the end of file (EOF), would not be modified.

It should also be noted that if a PBC encrypted block of data i was modified, then the CBC encrypted block of data preceding it, i.e. block i–1, would need to be decrypted to get the plaintext to decrypt block i. At most, one additional block of data would need to be re-encrypted in addition to the modified block i. Thus, with the mechanism of the illustrative embodiments, at most the modified block of data and two additional blocks of data need to be re-encrypted when a modification to a block of data in a file of an EFS is made. Moreover, at most one previous block of data in the sequence of blocks of data for a file in the EFS needs to be decrypted in order to be able to decrypt a block of encrypted data so that the block of encrypted data may be modified.

Because the amount of decryption and re-encryption is limited by the mechanisms of the illustrative embodiments, the ABC encryption methodology of the illustrative embodiments may be used efficiently with an EFS. That is, the ABC encryption methodology of the illustrative embodiments does not cause large latencies when modifying portions of data in an EFS since the amount of decryption and re-encryption is minimized.

Figure 7:
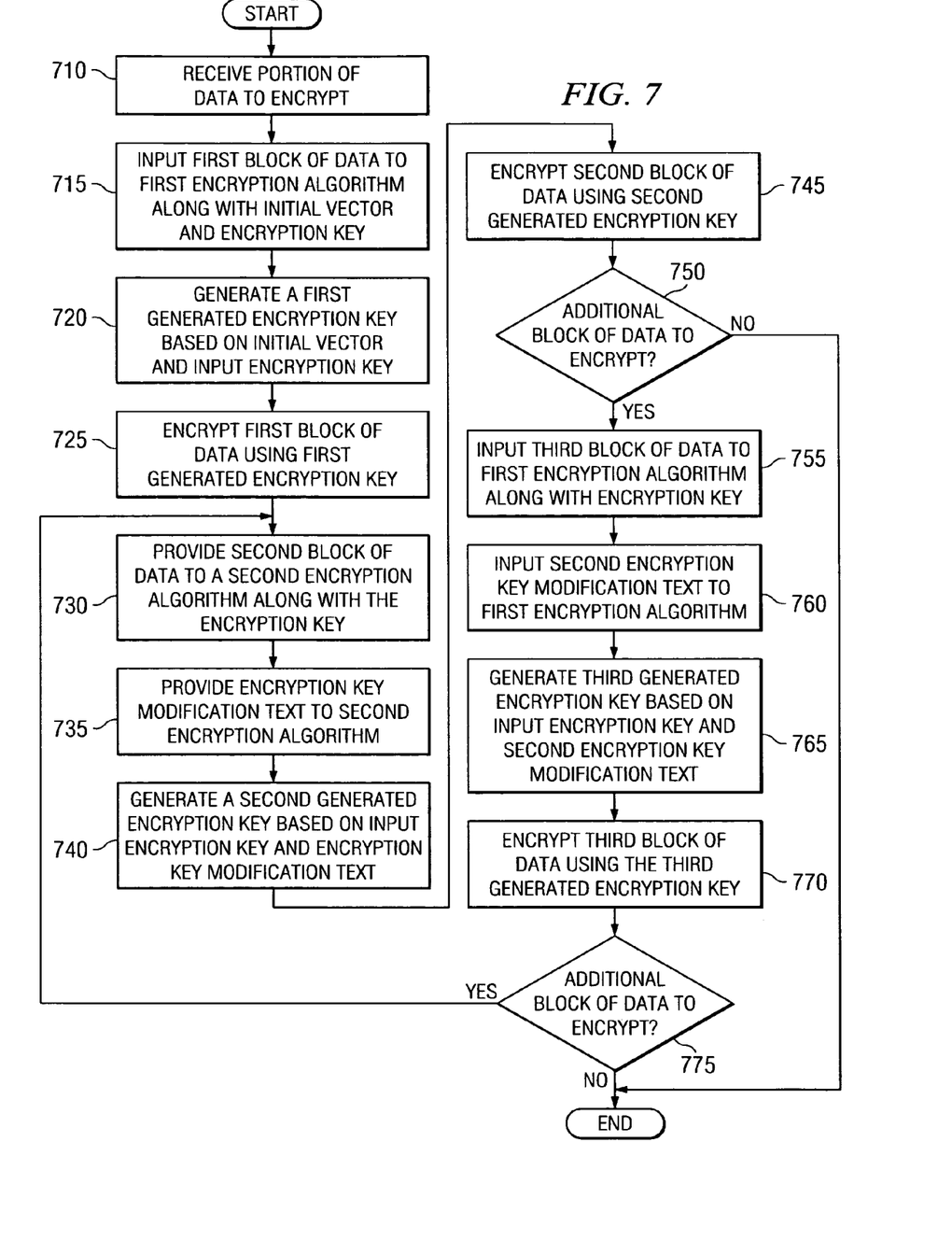
FIG. 7 is a flowchart outlining an exemplary operation for encrypting a portion of data in accordance with one illustrative embodiment.
Figure 8:
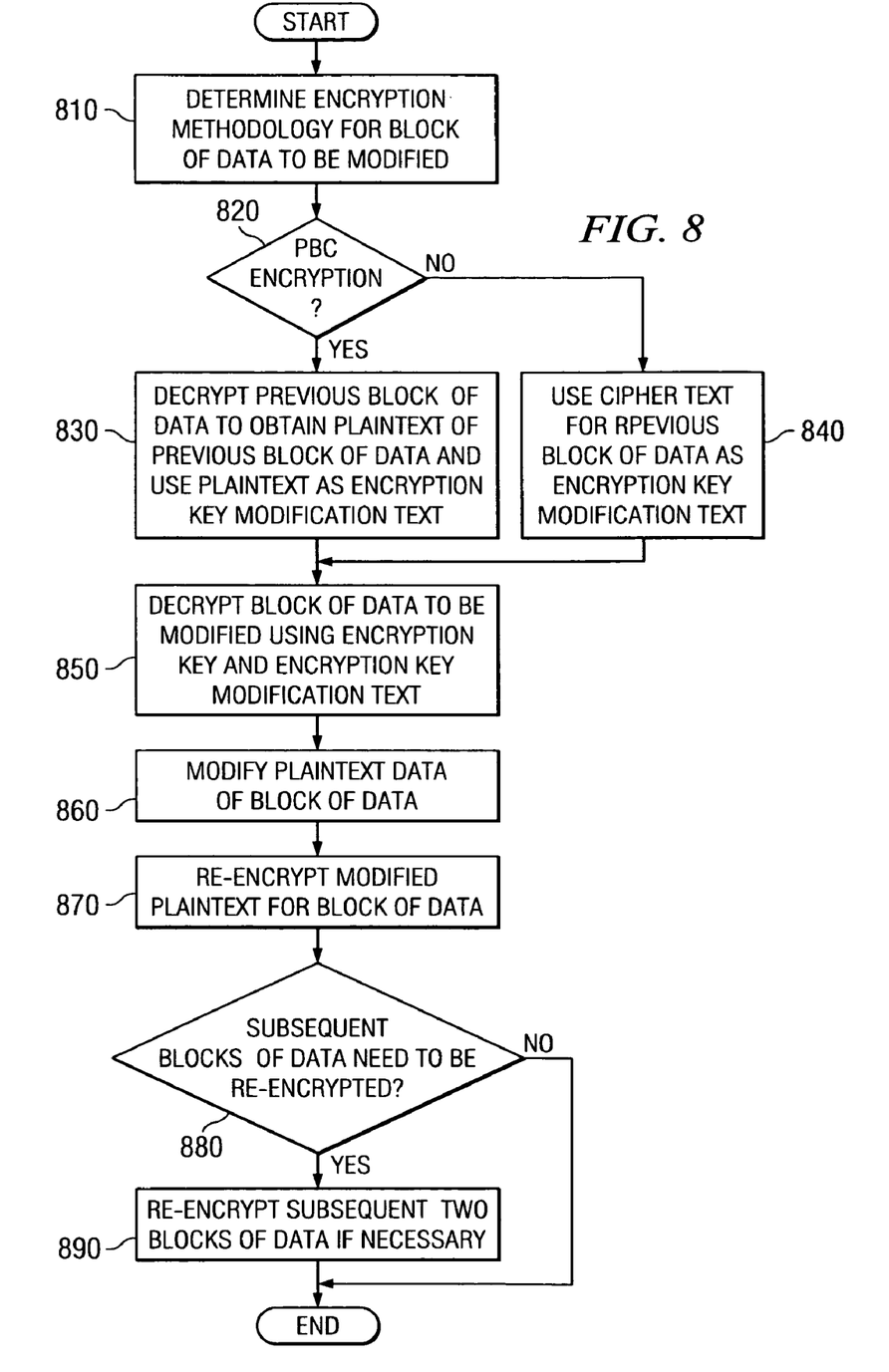
FIG. 8 is a flowchart outlining an exemplary operation for performing a modification to a block of encrypted data that is encrypted using the ABC encryption methodology of the illustrative embodiments.

FIGS. 7-8 are flowcharts outlining exemplary operations of illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 7 is a flowchart outlining an exemplary operation for encrypting a portion of data in accordance with one illustrative embodiment. It should be noted that the operation described in FIG. 7 may be performed within the ABC encryption mechanism 530 of FIG. 5, for example. Thus, the operations described in FIG. 7 may be performed by the PBC and CBC encryption/decryption modules 532 and 534 of the ABC encryption mechanism 530, for example, under the control of the controller 536.

As shown in FIG. 7, the operation starts with receiving the portion of data (step 710). A first block of data of the portion of data is input to a first encryption algorithm along with an initial vector and an encryption key (step 715). The initial vector and encryption key are used to generate a first generated encryption key (step 720). As described above, the first generated encryption key may be generated by XORing the initial vector with the encryption key, for example. The first generated encryption key is used to encrypt the first block of data and generate a first cipher text (step 725).

A second block of data in the portion of data is provided to a second encryption algorithm along with the encryption key (step 730). Depending upon the type of the second encryption algorithm, e.g., PBC or CBC, either the plaintext data for the first block of data or the cipher text generated by the encryption of the first block of data, hereafter referred to as the encryption key modification text, are also input to the second encryption algorithm (step 735). The encryption key and the encryption key modification text are used to generate a second generated encryption key (step 740). The second encryption key is then used to encrypt the second block of data and generate a second cipher text (step 745).

A determination is made as to whether there is an additional block of data to be encrypted (step 750). If not, the operation terminates. If there is an additional block of data to be encrypted, a third block of data in the portion of data is provided to the first encryption algorithm along with the encryption key (step 755). A second encryption key modification text, either the plaintext data from the second block of data or the second cipher text depending on the type of the first encryption algorithm, for example, is provided to the first encryption algorithm (step 760). The encryption key and second encryption key modification text are used to generate a third generated encryption key (step 765). The third generated encryption key is then used by the first encryption algorithm to encrypt the third block of data (step 770).

A determination is made as to whether there is an additional block of data to be encrypted (step 775). If not, the operation terminates. If there is an additional block of data to be encrypted, the operation returns to step 730 and the operation is repeated such that subsequent blocks of data are encrypted using the plaintext or cipher text from a previous block of data.

FIG. 8 is a flowchart outlining an exemplary operation for performing a modification to a block of encrypted data that is encrypted using the ABC encryption methodology of the illustrative embodiments. As with FIG. 7 above, it should be noted that the operation described in FIG. 8 may be performed within the ABC encryption mechanism 530 of FIG. 5, for example. Thus, the operations described in FIG. 8 may be performed by the PBC and CBC encryption/decryption modules 532 and 534 of the ABC encryption mechanism 530, for example, under the control of the controller 536.

As shown in FIG. 8, the operation starts by determining an encryption methodology used to encrypt the block of data that is to be modified (step 810). For example, the type of encryption methodology may be determined by identifying a block number for the block of data from a beginning of a portion of data including the block of data. For example, if the ABC encryption methodology uses PBC encryption for every even numbered block of data and CBC encryption for every odd numbered block of data, then determining the block number for the block of data that is to be modified may be used to identify the type of encryption performed on that block of data.

A determination may be made as to whether encryption type for the block of data to be modified is a PBC encryption type (step 820). If so, then a previous block of data in a sequence of blocks of data in the portion of data may be decrypted to obtain the plaintext data for the previous block of data which is utilized as an encryption key modification text (step 830). If not, then the cipher text associated with the previous block of data is utilized as the encryption key modification text (step 840). The block of data to be modified is decrypted using the encryption key and the encryption key modification text to generate a generated encryption key (step 850).

The decrypted plaintext data for the block of data is then modified (step 860). The modified plaintext is then re-encrypted using the corresponding encryption algorithm and the generated encryption key (step 870). A determination is made as to whether subsequent blocks of data need to be re-encrypted (step 880). This determination may be based on whether the modified plaintext data of the modified block of data is used to modify an encryption key for a subsequent block of data. If so, then the next two blocks of data in the portion of data are re-encrypted using their associated encryption algorithms (step 890). The operation then terminates.

Thus, the illustrative embodiments provide a mechanism for encrypting and decrypting data such that the performance of an Encrypted File System is made more efficient. The illustrative embodiments alternate encryption algorithms used for a sequence of blocks of data. The alternating of encryption algorithms limits the amount of decrypting and re-encryption needed to perform modifications to blocks of data in a sequence of blocks of data.

It should be noted that the illustrative embodiments may take the form of an entirely hardware embodiment, an entirely software embodiment or an embodiment containing both hardware and software elements. In one illustrative embodiment, the mechanisms of the illustrative embodiment are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

As described above, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for encrypting a sequence of data, comprising:
   receiving the sequence of data;
   processing blocks of data in the sequence of data using at least two encryption mechanisms to generate an encrypted sequence of data; and
   outputting the encrypted sequence of data, wherein processing blocks of data in the sequence of data using the at least two encryption mechanisms comprises alternating between the at least two encryption mechanisms at each block of data in the sequence of data, wherein the at least two encryption mechanisms comprise a first encryption mechanism implementing a first encryption algorithm of a first encryption type and a second encryption mechanism implementing a second encryption algorithm of a second encryption type, and wherein the first encryption type and the second encryption type are different from each other, wherein alternating between the at least two encryption mechanisms at each block of data in the sequence of data comprises:
   encrypting a first block of data, in the sequence of data, using the first encryption mechanism;
   encrypting a second block of data, in the sequence of data, using the second encryption mechanism, wherein the encryption of the second block of data by the second encryption algorithm is dependent upon one of an input or an output of the first encryption mechanism; and
   encrypting a third block of data, in the sequence of data, using the first encryption mechanism, wherein the encryption of the third block of data by the first encryption mechanism is dependent upon one of an input or an output of the second encryption mechanism, and wherein:
   the first encryption mechanism implements a Cipher Block Chaining (CBC) encryption methodology and the second encryption mechanism implements a Plaintext Block Chaining (PBC) encryption methodology,
   the first encryption mechanism utilizes a cipher generated for a previous block of data in the sequence of data to generate a first key for the CBC encryption methodology,
   the second encryption mechanism utilizes plaintext data for a previous block of data in the sequence of data to generate a second key for the PBC encryption methodology,
   the first encryption mechanism utilizes the cipher generated for the previous block of data to generate the first key by logically combining the cipher with a first encryption key,
   the second encryption mechanism utilizes the plaintext data for the previous block of data to generate the second key by logically combining the plaintext data with a second encryption key, and
   the second encryption key is one of the same as or different from the first encryption key.

2. The method of claim 1, wherein all odd numbered blocks of data in the sequence of data are encrypted using the first encryption mechanism that implements the CBC encryption methodology and all even numbered blocks in the sequence of data are encrypted using the second encryption mechanism that implements the PBC encryption methodology.

3. The method of claim 1, wherein outputting the encrypted sequence of data comprises storing the encrypted sequence of data as a file in an Encrypted File System (EFS).

4. The method of claim 1, further comprising:
receiving the encrypted sequence of data;
identifying a block of data, in the sequence of data, to be modified;
determining an encryption methodology used to encrypt the block of data to be modified;
decrypting the block of data based on the determined encryption methodology used to encrypt the block of data;
modifying the block of data to be modified; and
re-encrypting the block of data to be modified following modification.

5. The method of claim 4, wherein decrypting the block of data based on the determined encryption methodology comprises:
decrypting a previous block of data in the sequence of data, that is just prior to the block of data to be modified in the sequence of data, using a cipher for a block of data that is just prior to the previous block of data to obtain plaintext data for the previous block of data; and
decrypting the block of data to be modified based on the obtained plaintext data for the previous block of data.

6. The method of claim 4, wherein re-encrypting the block of data to be modified following modification comprises re-encrypting up to two additional blocks of data following the block of data to be modified in addition to the block of data to be modified.

7. The method of claim 4, wherein decrypting the block of data based on the determined encryption methodology comprises decrypting up to one block of data prior to the block of data to be modified, in the sequence of data, in addition to the block of data to be modified.

\* \* \* \* \*